United States Patent [19]
Sonobe

[11] Patent Number: 6,069,468
[45] Date of Patent: May 30, 2000

[54] BATTERY PACK

[75] Inventor: Satoshi Sonobe, Yokohama, Japan

[73] Assignee: NEC Moli Energy Corp., Yokohama, Japan

[21] Appl. No.: 09/350,171

[22] Filed: Jul. 9, 1999

[30] Foreign Application Priority Data

Jul. 10, 1998 [JP] Japan .................................. 10-195470

[51] Int. Cl.⁷ .................................................. H01M 10/46
[52] U.S. Cl. .......................................................... 320/106
[58] Field of Search ..................................... 320/106, 110, 320/132, 149, FOR 102, FOR 142, FOR 147, DIG. 18, DIG. 21; 324/426, 429, 433; 429/61, 90

[56] References Cited

U.S. PATENT DOCUMENTS 5,767,659  6/1998  Farley ...................................... 320/106

*Primary Examiner*—Edward H. Tso
*Attorney, Agent, or Firm*—Armstrong, Westermanm, Hattori, McLeland & Naughton

[57] ABSTRACT

The present invention provides a battery pack, in which both specific information such as information for identifying the battery and information of battery status are stored. The battery pack has a rewritable storage device for storing the specific information of the battery and the information of battery status, and operation switching means for switching operation status of the battery to a testing mode or to a normal mode. It is designed in such manner that the specific information and the battery status information stored in the storage device are turned to rewritable in the testing mode, and that the specific information of the battery is turned to non-rewritable in the operation mode.

13 Claims, 3 Drawing Sheets

6,069,468

BATTERY PACK

BACKGROUND OF THE INVENTION

The present invention relates to a battery pack using lithium ion battery or the like, and in particular, to a battery pack comprising a charge control unit, which contains specific information for each battery and stores status information of each battery and can adequately control charging and discharging of the battery.

Small size electronic equipment and devices are widely propagated now, and batteries are used to supply electric power to these equipment and devices. Small size and large capacity sealed type battery, i.e. non-aqueous electrolytic solution type battery such as nickel hydrogen battery, lithium ion secondary battery, etc., are now used as power source for portable telephone set, lap-top personal computer, camera-integrated video recorder, etc.

In battery-using equipment, i.e. equipment where battery is attached and used, battery pack comprising different types of batteries such as nickel-cadmium battery, nickel hydrogen battery, lithium ion battery, etc. is often used depending upon each intended purpose, and it is necessary to perform charging and discharging according to the method suitable for each type of battery.

Also, even when the batteries belong to the same type, capacity of the battery may be different or properties of the batteries may differ according to active material or other material of each battery. Thus, it is necessary to identify type of each battery and to perform charging and discharging by a method suitable for each battery type.

A battery and a battery-using portable equipment are known from JP-A-10097875, in which there is provided an EEPROM memory to store information of battery types and brands, and when a battery is mounted on a battery-using equipment, it is identified from the stored information whether it can be used on the battery-using equipment or not, or charging and discharging are performed according to a method suitable for each type of battery.

Further, a portable type electronic device is known from JP-A-06310179 or JP-A-07230344. This portable electronic device has a battery pack, which comprises a storage device for storing battery status and an interface circuit to control access to the storage device from the electronic device itself.

However, in the conventional type battery pack, it has been simply proposed to provide a storage device for identifying specific information of the battery or a storage device for indicating battery status. No proposal has been made on a type of battery pack, in which battery can be placed under perfect control on the operating status of the battery from the time of manufacture of the battery pack.

It is an object of the present invention to provide a battery pack under perfect control of the battery pack operation, by which it is possible to easily carry out various tests at the time of manufacture of the battery pack, to use the results of the tests as information for the subsequent operation of the battery pack, and to apply the information for common use of battery packs having different properties such as charge/discharge capacity, charge/discharge voltage, etc.

SUMMARY OF THE INVENTION

The battery pack according to the present invention comprises a rewritable storage device for storing specific information of the battery pack and information of operation status of the battery pack, and operation mode switching means for switching the operating status to a testing mode and a normal mode, whereby specific information and information of operation status of the battery pack stored in the rewritable storage device are turned to rewritable in the testing mode, and specific information of the battery is turned to non-rewritable in the operation mode.

The present invention also provides a battery pack as described above, wherein the rewritable storage device is an electrically rewritable non-volatile memory.

Further, the present invention provides a battery pack as described above, wherein there is provided a display unit, and the display unit is always turned on or is flashing in the testing mode in order to indicate that the battery is in the testing mode.

The present invention also provides a battery pack as described above, wherein the display unit comprises a lighting switch functioning in the operation mode and indicating the status of the battery only when operation is indicated by the lighting switch.

Further, the present invention provides a battery pack as described above, wherein the rewritable storage device stores an electric current difference obtained from a measured value by external measuring means for measuring charge/discharge current flowing to and from the battery in the testing mode and a measured value of charge/discharge current by current detection means of a battery provided in the battery pack.

Also, the present invention provides a battery pack as described above, wherein the rewritable storage device stores at least one of groups of specific information including properties of each battery in the battery pack determined from each battery pack, charge/discharge capacity, charge/discharge voltage, charge/discharge current, overcharge protection voltage, overdischarge protection voltage, number of batteries accommodated, and series/parallel connection information of batteries.

The present invention further provides a battery pack as described above, wherein there is provided charge/discharge control means for controlling charge/discharge current based on the electric current difference stored in the rewritable storage device in the operation mode.

DETAILED DESCRIPTION OF THE PREFERRED EMBODIMENT

In the battery pack according to the present invention, operation is switched over to a testing mode or a normal mode via an interface from outside by operation mode switching means which is arranged in a battery pack. In the testing mode, results of various tests are displayed on a display unit and are recorded in a storage device, and the results can be further transferred to outside via interface and can be outputted to testing unit, printer, etc. In the normal mode, normal charging and discharging of the battery are controlled. It is designed in such manner that specific information for each individual battery as stored in the testing mode is not rewritable in the normal mode. As a result, on a battery-using equipment, i.e. an equipment or a device, on which the battery pack is used, it is possible to readily confirm whether the battery pack is usable or not. Also, information such as remaining capacity of the battery, duration of possible operation, etc. can be displayed on the display unit or on the battery-using equipment.

Figure 1:
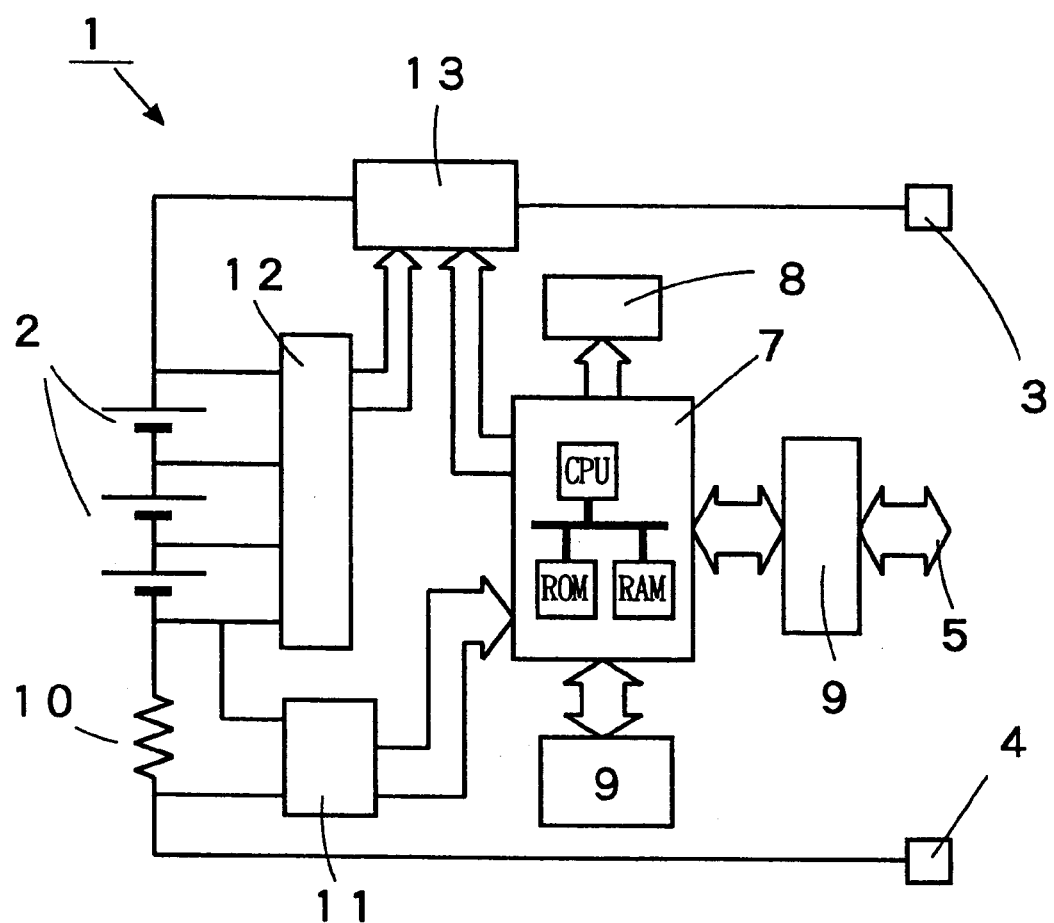
FIG. 1 is a block diagram for explaining an embodiment according to the present invention.

In the following, description will be given on the present invention referring to the attached drawings:

FIG. 1 is a block diagram for explaining an embodiment of the present invention. A battery pack 1 comprises at least one battery 2, and it is mounted on an equipment or a device such as personal computer using a mechanism to attach or remove the battery pack.

The battery pack 1 comprises power terminals 3 and 4 on positive electrode side and negative electrode side respectively, through which charging current is supplied to the battery pack and electric current to the battery-using equipment is supplied. On the battery pack, there is provided a system bus 5 for exchanging information with external devices, and information is exchanged between the battery pack and the external device via an interface 6.

The battery pack 1 comprises main control means 7, which is connected to a display unit 8 containing components such as a light emitting diode and to a rewritable storage device 9.

As the rewritable storage device 9, a storage device comprising EEPROM can be used.

Voltage across the two ends of an electric current detection resistance 10 installed in series to the battery is supplied to electric current detecting means 11, and output of the electric current detecting means is fed to the main control means 7. By integrating charging current, which has been detected by the electric current detecting means, battery capacity thus charged can be calculated. By integrating electric current at the discharging, the discharged capacity is calculated. From the difference between the charged battery capacity and the discharged battery capacity, the remaining battery capacity can be calculated. The remaining battery capacity thus calculated is stored in the storage device 9 and the battery capacity is displayed on the display unit 8.

The battery pack comprises a battery voltage monitor circuit 12 and a charge/discharge control circuit 13, and these circuits monitor voltage at charging or discharging of the battery and control voltage or current at charging and discharging.

Figure 2:
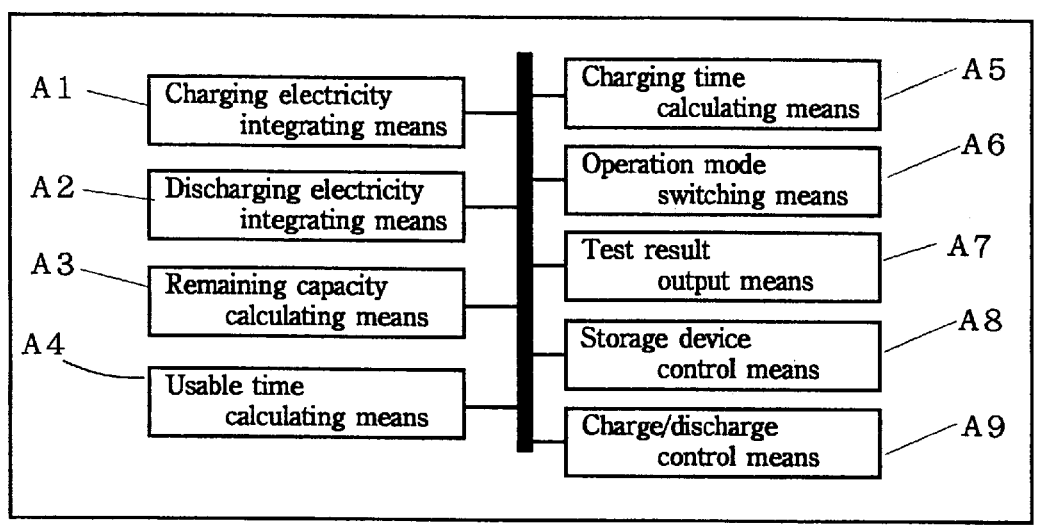
FIG. 2 is a drawing to show an essential arrangement of main control means.

FIG. 2 shows an essential arrangement of the main control means.

The main control means 7 comprises charging electricity integrating means A1 for obtaining electricity quantity charged in the battery by integrating electric current value supplied to the battery at the charging, discharge current integrating means A2 for obtaining discharged electricity quantity by integrating electric current discharged from the battery at the discharging, remaining capacity calculating means A3 for obtaining remaining capacity of the battery from a difference between the charged electricity quantity and the discharged electricity quantity, usable time calculating means A4 for obtaining duration of possible battery operation from the remaining capacity and the discharge current of the battery, charging time calculating means A5 for calculating duration of time up to full charging, operation mode switching means A6 for switching the operation mode to the testing mode for performing various tests for the battery pack or to the normal operation mode of the battery pack, test result output means A7 for outputting test result to devices such as display unit or external printer, storage device control means A8 for rewriting data of the rewritable storage device, and charge/discharge control means A9 for controlling charge/discharge control circuit.

Next, description will be given on operation of the battery pack according to the present invention.

On a battery-using equipment, i.e. an equipment or a device, on which the battery is used, it is necessary to confirm whether the battery is suitable for intended purpose or not. In this respect, it must be identified whether the battery can be used from the viewpoint of the equipment or the device, to which the battery pack is connected.

For this reason, when the battery pack is manufactured, specific information such as design capacity of the battery pack, design voltage, date of manufacture, type of battery, capacity of individual batteries of the battery pack, etc. must be recorded in the battery pack. When the battery pack is used, the specific information is read from the equipment or the device, on which the battery is used, and it is necessary to check whether the battery is suitable for the purpose or not.

However, it is important to take special care that the specific information of each battery pack may not be erroneously rewritten on the side of battery users. It must be designed in such manner that the specific information can be rewritten only when the battery is switched over to the testing mode at the time of manufacture or maintenance.

In order to prevent erroneous switching to the testing mode during operation, the switching to the testing mode must be limited in such manner that it is performed only by inputting of a command highly secrecy-protected from outside or by the use of means such as specific electric circuit. Sufficient measures must be taken to prevent accidental switching error, e.g. due to chattering noise which occurs when the battery pack is inserted into or removed from the equipment.

For example, there is an adequate method to switch over to the testing mode when the same data group or another specific data group is written at a specific timing after a specific data group comprising two or more data has been written.

In the testing mode, the test for the battery pack is carried out (examples are given in the table below). The test data is taken out to outside via the interface, and the data is transferred to printer, external power source, or battery-using equipment, and the data may be printed or used on each of the equipment or devices.

TABLE 1

| | | |
|---|---|---|
| 1. | Thermistor terminal resistance value | Resistance between thermistor and negative electrode terminal is measured. |
| 2. | Initial operation 1 (Charging) | Charging current is measured when constant voltage constant current power source is connected. |
| 3. | Initial operation 2 (Discharging) | Discharging current is measured when constant current load is connected. |
| 4. | Continuity test (1A charging) | Input voltage is measured when constant voltage constant current power source is connected. |
| 5. | Opening test | After continuity test, output voltage at the opening of input is measured. |
| 6. | Discharging test | Output voltage is measured when constant current load is connected. |
| 7. | Overcurrent protection test | Time from connection of constant current load up to cutoff of output is measured. |
| 8. | Overcurrent protection restoration test (Charging) | Constant voltage constant current power source is connected, and it is judged whether charging can be carried out or not. |

TABLE 1-continued

| | |
|---|---|
| 9. Overcurrent protection restoration test (Discharging) | Discharging current is measured when constant current load is connected. |
| 10. Lighting test | By pressing switch, lighting of display unit such as LED is confirmed. |

In the testing mode, the test result may be displayed on the display unit. In order to avoid trouble or inconveniences such as shipment of the product in the state of the testing mode, the testing mode is displayed by lighting up or flashing LED on the display unit. Only when the testing mode is terminated and it has been switched to the operation mode, LED on the display unit should be turned off. With such arrangement, it can be easily identified whether it is in the testing mode or in the operation mode, and this makes it possible to prevent the shipment of the product in the testing mode.

Figure 3:
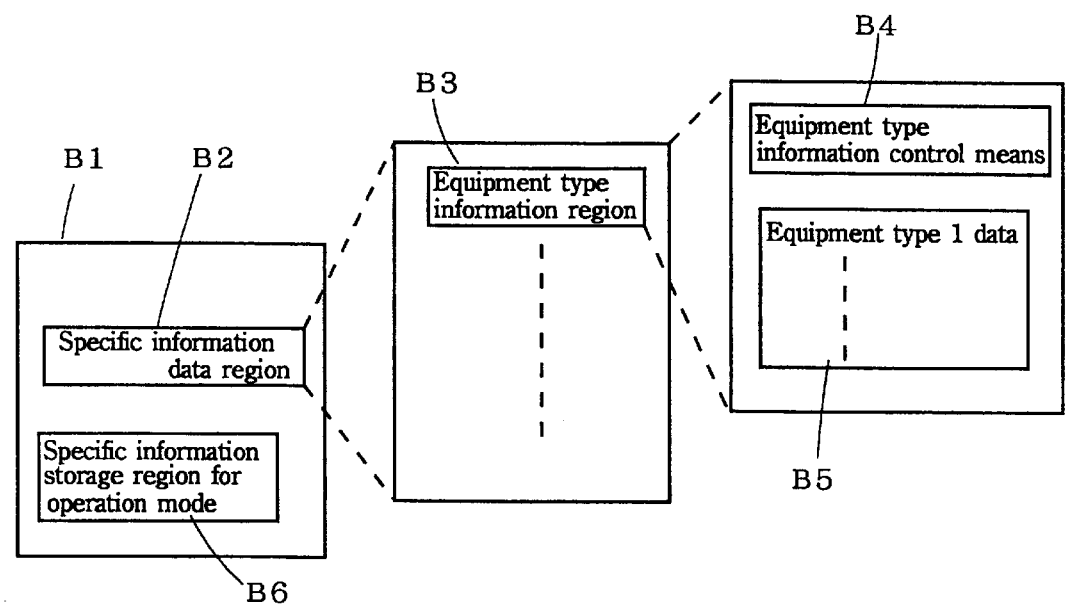
FIG. 3 is a drawing for explaining a rewritable storage device.

FIG. 3 is a drawing for explaining a rewritable storage device.

After the battery pack has been manufactured, it is operated first in the testing mode, and equipment type selection data must be inputted. When the equipment type selection data is inputted, data such as property of each battery, charge/discharge capacity, charge/discharge voltage, charge/discharge current, overcharge protection voltage, overdischarge protection voltage, number of the accommodated batteries, and series/parallel connection information of battery are selected for each equipment from equipment type selection data region B5 by equipment type information control means B4 of equipment type information region B3 provided in specific information data region B2 in the specific information region B1. These data are stored in the specific information storage region B6 for the operation mode in the specific information region B1 and are used in the subsequent operation of the battery pack.

As described above, a large number of data different for each equipment type are stored. Thus, by simply selecting the equipment type in the testing mode, it is possible to operate a large number of battery packs having different properties depending on the type and number of the batteries in the battery pack, series/parallel connecting modes, etc. by a control method common to all purposes.

Further, in the testing mode, the data required for operation of the battery such as electric current difference obtained from electric current measured in the initial operations 1 and 2 as shown in Table 1 and electric current measured by current detection means in the battery pack are also stored in the specific information storage region B6 for operation mode, and these data can be used in the operation mode of the battery pack.

Also, in normal operation mode, the electric current flowing to or from the battery at the charging or discharging is detected as voltage across the two ends of the current detection resistance 10 provided in series to the battery as shown in FIG. 1, and the output of the current detection means 11 is supplied to the main control means 12. Then, by the charging electricity integrating means A1, the discharging current integrating means A2, the remaining capacity calculating means A3, etc. in the main control means, the remaining capacity is displayed on the display unit. Further, output of the usable time duration calculating means A4 or the charging time calculating means A5 can be displayed on the display unit, and the results of the calculation can be recorded in the storage device 9.

The power for the operation of storage device, main control means, etc. may be supplied from the battery. In case power source such as the power source for charging is connected, or in case electric current is supplied to the battery-using equipment via public electricity cable, power source may be switched over by external power source switching means installed in the main control means.

In normal operation mode, the main control means is operated in low rate mode of about 32 kHz clock frequency. When electric current or voltage is detected or when communication is performed with the battery-using equipment, it is operated at high rate mode of about 2 MHz clock frequency. By changing the processing rate, it is possible to reduce power consumption.

Also, by supplying electric current only in case electric current is detected by the main control means in the feeding of electric current to electric current detection means, it is possible to reduce power consumption. When battery voltage is decreased to a predetermined voltage level, operation of the main control means is stopped, and by operating only battery protecting portion of the battery voltage monitor circuit or the charge/discharge control circuit, power consumption can be reduced.

The storage device comprises EEPROM, and status information stored in the storage device can be maintained even when the battery pack is removed from the battery-using equipment and there is no remaining capacity in the battery pack.

During the charging, voltage determined by the battery voltage monitor means, electric current measured by the battery current measuring means and charging pattern to match the stored battery properties can be adjusted, and adequate charging suitable for the battery can be carried out by operating the charge/discharge control means.

The main control means in the battery pack of the present invention is operated with the battery pack installed on the battery-using equipment. When the battery pack is mounted on the battery-using equipment, the status information of the battery is read from the storage device of the battery pack from the battery-using equipment. In this way, information such as the remaining battery capacity, type of the battery, etc. of the battery pack can be identified. Based on these data, the possible operation time of the battery pack is obtained by a predetermined calculation procedure. It is preferable that the remaining capacity of the battery is displayed by operation of display switch on the battery pack even when the battery is removed from the battery-using equipment.

Communication between the battery pack of the present invention and the battery-using equipment is performed using a signal, which is a combination of instruction code and address as normally used in communication between devices. In the communication, errors of transmission or receiving of data due to disturbance such as noise can be prevented by the use of control code, addition of parity bit, etc.

According to the present invention, there is provided switching means for switching the operation mode of the battery pack to the testing mode or to the normal mode. In the testing mode, various tests for the battery can be performed and the specific information and the status information of the battery stored in the rewritable storage device are turned to rewritable. In normal mode, it is designed that specific information cannot be rewritten. As a result, testing can be easily performed during manufacture or maintenance of battery, and the remaining capacity of the battery pack can be identified at an earliest timing.

Because specific information for each equipment type is stored in the storage device, it is possible to select an operation mode to match the equipment type by simply selecting the specific information for each equipment type.

What we claim is:

1. A battery pack with a secondary battery, comprising a rewritable storage device for storing specific information of the battery pack and information of operation status of the battery pack, and operation mode switching means for switching the operating status to a testing mode and a normal mode, whereby specific information and information of operation status of the battery pack stored in the rewritable storage device are turned to rewritable in the testing mode, and specific information of the battery is turned to non-rewritable in the operation mode.

2. A battery pack according to claim 1, wherein said rewritable storage device is an electrically rewritable non-volatile memory.

3. A battery pack according to claim 1, wherein there is provided a display unit, and said display unit is always turned on or is flashing in the testing mode in order to indicate that the battery is in the testing mode.

4. A battery pack according to claim 2, wherein there is provided a display unit, and said display unit is always turned on or is flashing in the testing mode in order to indicate that it is in the testing mode.

5. A battery pack according to claim 1, wherein said display unit comprises a lighting switch functioning in the operation mode and indicating the status of the battery only when operation is indicated by the lighting switch.

6. A battery pack according to claim 2, wherein said display unit comprises a lighting switch functioning in the operation mode and indicating the status of the battery only when operation is indicated by the lighting switch.

7. A battery pack according to claim 3, wherein said display unit comprises a lighting switch functioning in the operation mode and indicating the status of the battery only when operation is indicated by the lighting switch.

8. A battery pack according to claim 4, wherein said display unit comprises a lighting switch functioning in the operation mode and indicating the status of the battery only when operation is indicated by the lighting switch.

9. A battery pack according to claim 1, wherein said rewritable storage device stores an electric current difference obtained from a measured value by external measuring means for measuring charge/discharge current flowing to or from the battery in the testing mode and a measured value of charge/discharge current by current detection means of a battery provided in the battery pack.

10. A battery pack according to one of claims 1 to 8, wherein there is provided charge/discharge control means for controlling charge/discharge current based on the electric current difference stored in the rewritable storage device in the operation mode.

11. A battery pack according to one of claims 1 to 8, wherein said rewritable storage device stores an electric current difference obtained from a measured value by external measuring means for measuring charge/discharge current flowing to or from the battery in the testing mode and a measured value of charge/discharge current by current detection means of a battery provided in the battery pack, and there is provided charge/discharge control means for controlling charge/discharge current based on the electric current difference stored in the rewritable storage device in the operation mode.

12. A battery pack according to one of claims 1 to 8, wherein the rewritable storage device stores at least one of the groups of specific information including properties of individual batteries in the battery pack, charge/discharge capacity, charge/discharge voltage, charge/discharge current, overcharge protection voltage, overdischarge protection voltage, number of batteries accommodated in the pack, and series/parallel connection information of the battery.

13. A battery pack according to one of claims 1 to 8, wherein the rewritable storage device stores electric current difference between a measured value of charge/discharge current flowing to the battery in the testing mode measured by external measuring means and a measured value of charge/discharge current detected by current detecting means of the battery provided within the battery pack, and the rewritable storage device also stores at least one of the groups of specific information including properties of individual batteries in the battery pack, charge/discharge capacity, charge/discharge voltage, charge/discharge current, overcharge protection voltage, overdischarge protection voltage, number of batteries accommodated in the pack, and series/parallel connection information of the battery.

* * * * *